April 7, 1953 W. R. BATTLES 2,633,895
CAR SEAT
Filed March 27, 1948 3 Sheets-Sheet 1
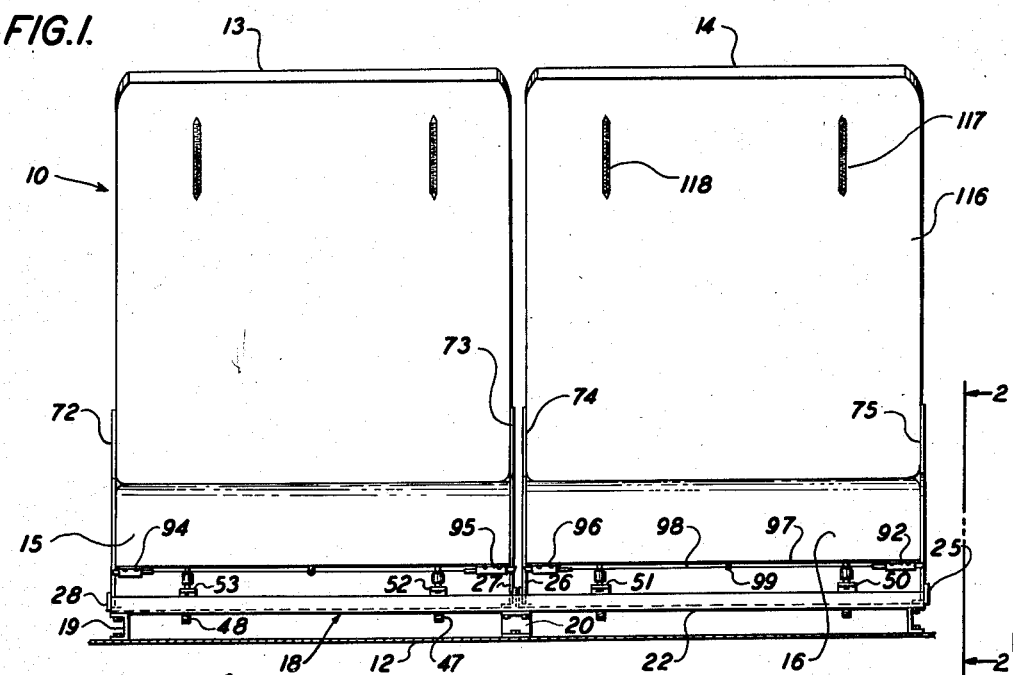
INVENTOR.
WILLIS R. BATTLES
BY
James B. Christie
ATTORNEY April 7, 1953     W. R. BATTLES     2,633,895
CAR SEAT
Filed March 27, 1948     3 Sheets-Sheet 2
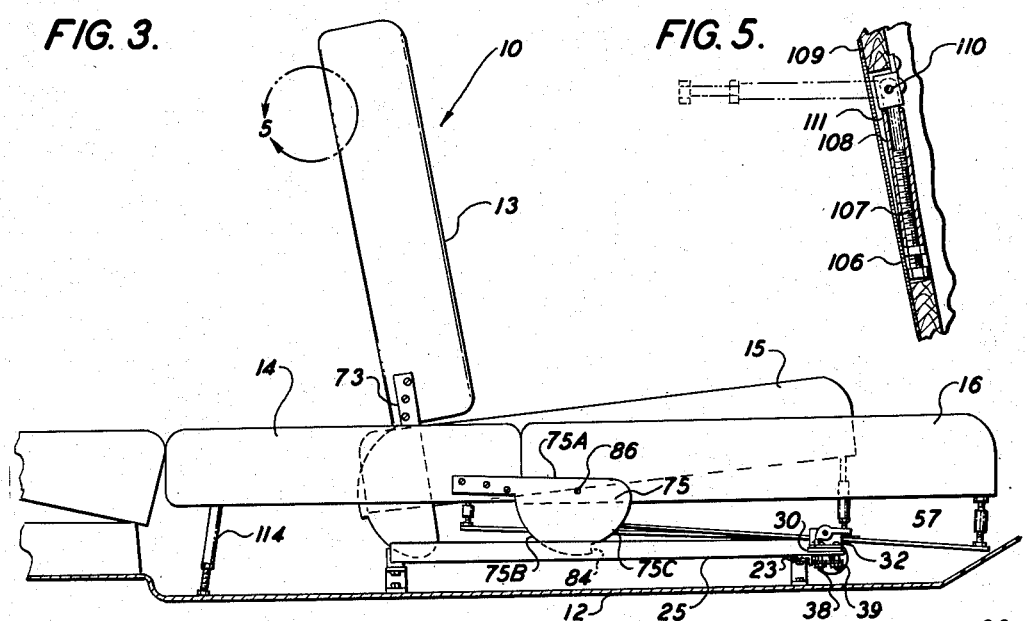
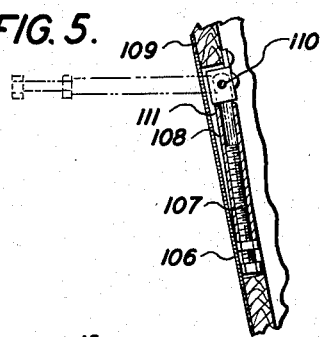
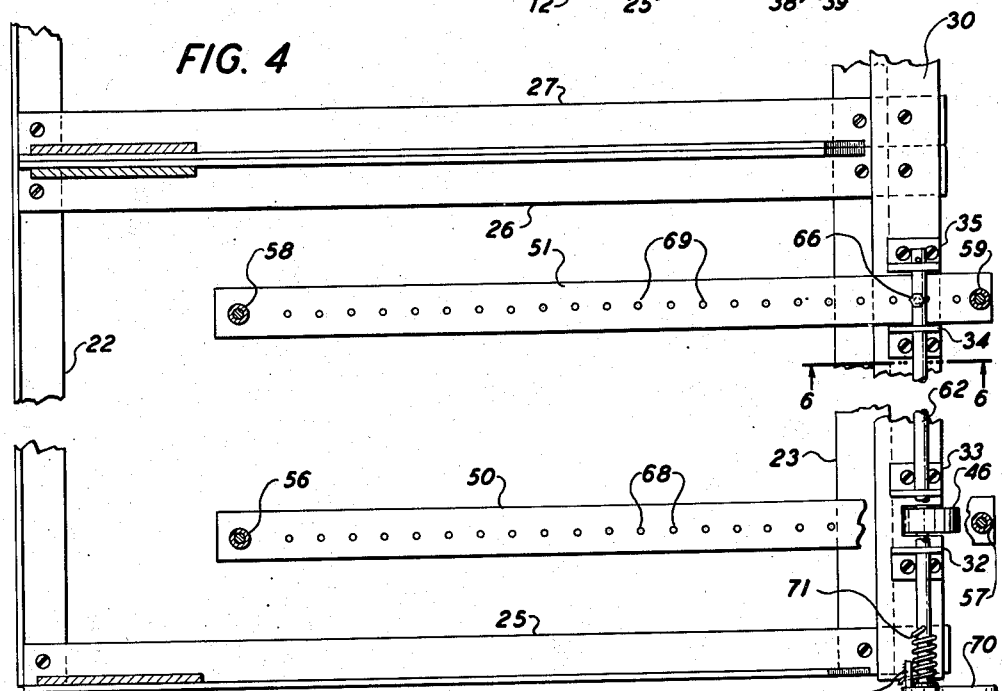
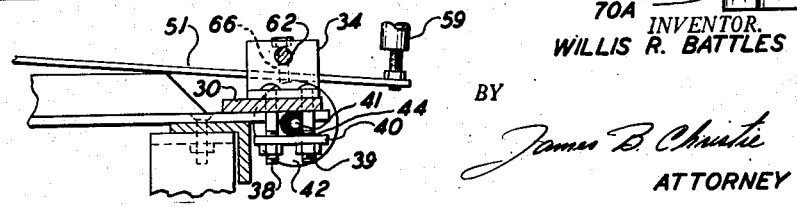
INVENTOR.
WILLIS R. BATTLES
BY
James B. Christie
ATTORNEY April 7, 1953  W. R. BATTLES  2,633,895
CAR SEAT
Filed March 27, 1948  3 Sheets-Sheet 3
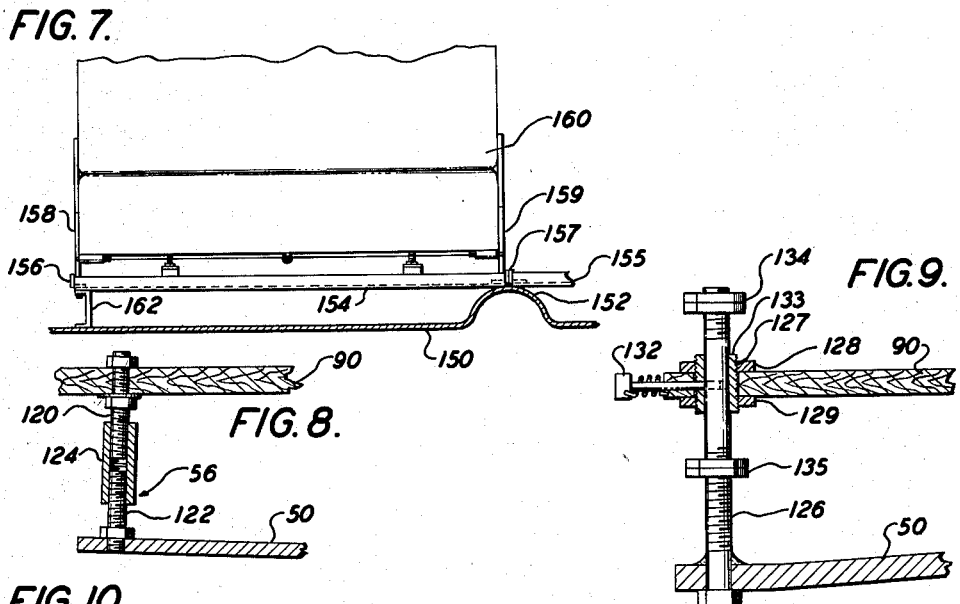
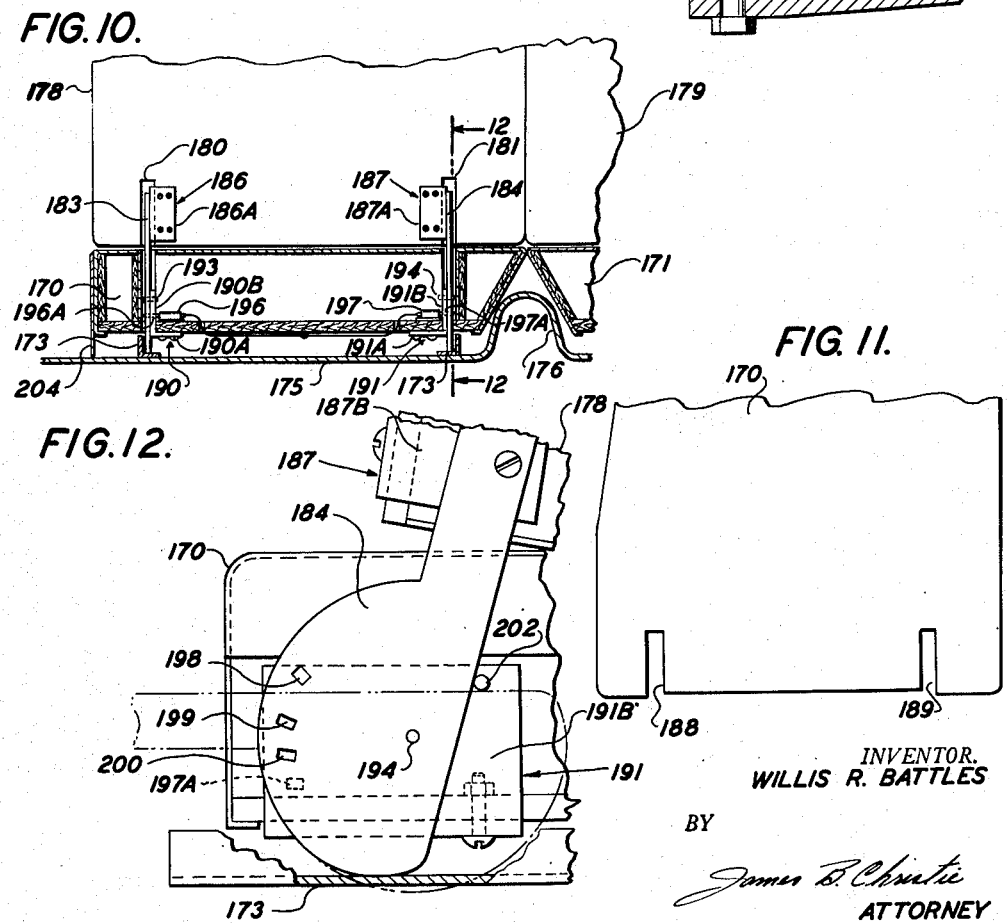
INVENTOR.
WILLIS R. BATTLES
BY
James B. Christie
ATTORNEY Patented Apr. 7, 1953

2,633,895

UNITED STATES PATENT OFFICE 2,633,895

CAR SEAT

Willis R. Battles, Redondo Beach, Calif., assignor to California Carbed Company, Los Angeles, Calif., a corporation of California Application March 27, 1948, Serial No. 17,560

7 Claims. (Cl. 155—7)

This invention relates to convertible vehicle seats and more particularly to automobile seats which function as a conventional seat and also may be easily and quickly converted to form a bed in the automobile.

It is an object of my invention to provide a highly simplified seat framework which is adapted to replace the existing front seat framework in substantially any make of automobile, and to support the conventional seat cushions in pivotal relationship so as to permit use thereof as a seat and also as a bed in the vehicle. In a co-pending application Serial No. 782,320, filed October 27, 1947, by Willis R. Battles and Ralph A. Battles, such a seat structure, particularly adapted for use in sedans is described. The present invention is directed to a front seat of the type described particularly for use in club coupés and two door sedans. These latter car models require a front seat, the back of which may be rotated forwardly to permit ingress to and egress from the back seat. Preferably, the back of such a seat is divided centrally so as to permit independent forward rotation of each side of the upright cushion member.

A feature of the present invention aside from the utility of the structure both as a bed and as a seat, is the possible complete independence of the two sides of the seat. Thus in one embodiment the driver's side and the passenger's side may be independently adjusted with respect to their positions in the automobile, made up into a bed or so positioned as to permit reclining intermediate the upright and prone positions. Thus on trips, etc., the passenger's side of the seat may be adjusted to form a bed while the back seat of the driver's side is left in driving position. Additional advantages of this independent operation will appear as the description proceeds.

The seat structure according to the present invention in one embodiment, comprises a framework mountable to the floor of the vehicle and forming spaced horizontal tracks running in the direction of the longitudinal axis of the vehicle. The forward part of the framework carries a plurality of rollers over which cushion supporting runners are mounted. Two horizontally disposed cushions mounted on the runners and longitudinally slideable therewith form the bottom cushions of the seat. Two back rest cushions provided at each end with downwardly projecting cam-shaped runners complete the seat structure. The cam-shaped runners travel in separate tracks of the framework and are rigidly mounted to the back rest cushions and pivotally mounted to the rear edge of the seat cushion.

A part of the track engaging surface of the cammed runners is curved on a radius from the point of pivotal mounting to permit rotation of the back rest cushions through a comparatively wide angle without altering the vertical level of the seat cushion. An off-set portion in the periphery of the cam serves to elevate the back edge of the seat cushion when the back rest is rotated to a horizontal position behind the seat cushion. Spring loaded catch means are engageable with the separate cams to releasably hold the back seat cushion in the vertical position or at one or more intermediate angles of inclination. The catch means are so associated with the cams that when held in the vertical position the back rest cushions are independently free to pivot forwardly to permit access to the back seat of the vehicle but are prevented from pivoting rearwardly past the comfortable riding position by the catch means.

The invention will be more clearly understood from the following detailed description taken in relation to the accompanying drawings in which:

Fig. 1 is a rear elevation of an assembled seat;

Fig. 2 is a partial side elevation taken on the line 2—2 of Fig. 1;

Fig. 3 is a side elevation showing the relationship of the front seat to the back seat and the means of forming a bed therewith;

Fig. 4 is a plan view taken on the line 4—4 of Fig. 2;

Fig. 5 is a section defined by the area 5 of Fig. 3;

Fig. 6 is a sectional elevation taken on the line 6—6 of Fig. 4;

Fig. 7 is a partial rear elevation of a modification of the seat of the invention particularly adapted for use in cars having elevated drive shaft tunnels therein;

Fig. 8 is a detailed sectional elevation of one means of mounting the seat cushion to one of the runners;

Fig. 9 is a sectional elevation showing an alternative means of mounting a seat cushion to the runners.

Fig. 10 is a partial rear elevation of an alternative seat structure wherein the cammed runners are not visible from the sides of the seat;

Fig. 11 is a partial plan view of the seat cushion in the embodiment of Fig. 10; and Fig. 12 is a sectional elevation taken on the line 12—12 of Fig. 10.

Referring to the drawing and particularly to Figs. 1, 2 and 3, the seat structure 10 of the invention is shown mounted to a floor 12 of a conventional automobile. The seat 10 comprises conventional back rest cushions 13, 14 shown in Figs. 1 and 2 in a substantially vertical position and the conventional seat cushions 15, 16 supported as shown in Fig. 2 in a substantially horizontal position.

A supporting framework 18 is mounted to the floor 12 of the automobile on a plurality of channel bushings 19, 20, etc. The framework 18 comprises a rear transverse angle iron 22 and a front transverse angle iron 23 supporting four transversely spaced longitudinal angle irons 25, 26, 27 and 28, which form a plurality of longitudinal tracks. A transverse strap 30 is supported across the front of the plurality of tracks and supports a number of rollers depending therefrom. Mounted across the upper face of the strap 30 are a plurality of brackets 32, 33, 34, 35, etc., grouped in pairs and having upwardly projecting oppositely facing flanges.

Depending from the strap beneath each of the brackets are a pair of bolts such as the bolts 38, 39 projecting through the bracket 34 and extending beneath the strap 30. (See Fig. 6.) A cleat 40 is supported on the lower ends of the bolts 38, 39 forming a housing for one end of an axle 41 of a roller 42. To eliminate metal to metal contact the axle 41 is provided with a rubber bushing 44. The opposite end of the axle 41 is housed in a similar cleat arrangement extending from beneath the strap 30 directly beneath the flange 35. In like manner the roller 46 is mounted adjacent the track 25 and the rollers 47, 48 are mounted adjacent the tracks 27, 28 respectively.

Each of the seat cushions 15, 16 is supported on a pair of straps or runners providing the front support for the cushions. Thus the cushion 16 is supported on straps 50, 51 and the cushion 15 on the straps 52, 53. As shown in Fig. 2 the cushion 16 is mounted to the strap 50 by turnbuckles 56, 57, and to the strap 51 by the turnbuckles 58, 59 (Fig. 6). The cushion 15 is mounted in like manner to the straps 52, and 53. Each of the cushion supporting straps are prevented from lateral motion by enclosure between one of the pair of oppositely facing flanges mounted on the transverse member 30. Thus the strap 50 passes between the flanges 32, 33 the strap 51 passes between the flanges 34, 35 and so on. Vertical displacement of the seat supporting straps 50, 51 is prevented by a rod 62 journaled through the flanges 32, 33, 34, 35 and the cushion supporting straps 52, 53 are similarly held within their associated flanges.

The rod 62, which overlies the straps 50, 51 and thereby prevents the whole seat structure from tipping backwardly, carries a depending pin 64 spaced between the flanges 32, 33 and a second depending pin 66 spaced between the flanges 34, 35. When in the vertical position the pins 64, 66 extend into one of a plurality of longitudinally spaced holes 68, 69 in the members 50, 51 respectively. In this position of the pins the seat cushion is locked with respect to forward or backward shift in the automobile. The rod 62 is provided at its outer end with a handle 70 and is spring loaded against clockwise rotation (with reference to Fig. 4) by a helical spring 71, counterclockwise rotation being prevented by a stop 70A projecting inwardly from the inner end of the handle 70. The pins 64, 66 are of smaller diameter than the strap holes 68, 69 into which they fit, the "slop" or tolerance being sufficient to permit rotation of the pins out of the holes by depression of the handle 70. When the seat has been adjusted as desired it may be locked in the adjusted position by releasing the handle 70.

Each of the back cushions carries a cam projecting at either side from the lower edge thereof. Thus referring to Fig. 1 the cams 72, 73 extend from the lower edge of the cushion 13 at opposite sides thereof. Similarly the cams 74, 75 extend from the cushion 14. As shown in Fig. 2, the cam 75 is rigidly affixed to the lower end of the cushion 14 by the bolts 76, 77, 78 and is also provided with a plurality of additional bolt holes 79, 80, 81, 82 in which the bolts 76, and 78 may be inserted permitting the seat 14 to be pivoted about the bolt 77 to change the normal angle of inclination thereof.

The lower end of the cam 75 which is identical with each of the other cams 72, 73, 74 has a straight forward edge 75A, a curvilinear trailing edge 75B and a curvilinear lower edge 75C. A radial shoulder 84 joins the edges 75B and 75C. The lower edge 75C is curved on a radius about point 86 at which the lower end of the cam is pivotally affixed to a bracket 88 mounted on the bottom board 90 of the seat cushion 16.

A spring loaded catch 92 is mounted to the rear end of the cushion bottom board 90 with the latch 93 in position to engage the shoulder 84. Catches 94, 95, and 96 are similarly associated with each of the cams 72, 73, 74 respectively. The adjoining pairs of catches, i. e. the catches 92, and 96 associated with the cams 75 and 74 respectively depending from the cushion 14 are connected by the pull chains 97, 98 passing through a centrally depending eyelet 99 through a single pull chain 100 passing through an eyelet 102 depending from the bottom of the seat cushion 16 and adjacent the outer edge thereof. A ring 103 affixed to the end of the chain 100 may be pulled to release the catches 92 and 96. A similar arrangement permits independent operation of the latches 94, 95.

Each of the back cushions 13, 14 is provided with a pair of legs pivotally mounted thereto adjacent its upper edge. Each of the legs, as shown in Fig. 5, comprises a foot 106 on the end of a threaded shank 107. The shank 107 is threaded into the end of an internally threaded tube 108 which is pivotally mounted to the back member 109 at 110. When the back cushion is in the upright position the leg rests within a receptacle 111 formed in the back member. When the seat back is pivoted to the horizontal position the leg falls downwardly to support the cushion off the floor in the manner of the leg 114 depending from the cushion 14 in Fig. 3.

Conveniently a slip cover or the like encloses the back cushion member and is provided with a zipper opening for each of the depending legs. Thus in Fig. 1 the cushion 14 has a seat cover 116 having the zippered openings 117 and 118 enclosing the legs.

Although the back rest cushions, as illustrated in the drawings, are each provided with two legs, this is not necessary. One leg centrally located with respect to the sides of the cushion will support the cushion, when in the horizontal position, entirely satisfactorily.

The manipulation of the seat structure while in the riding position is simple. Thus the elevation and tilt on the horizontal cushions 15, 16 are controllable by adjustment of the turnbuckles 56, 57, etc. One of these turnbuckles, say 56, is shown in detail in partial sectional view of Fig. 8.

The turnbuckle 56, which is identical to the other turnbuckles employed, comprises a bolt 102 rigidly cleated to the seat bottom 90 and a second bolt 122 rigidly affixed to the seat supporting member 50. A threaded sleeve 124 is threaded onto the adjoining ends of the two bolts. Rotation of the sleeve, which is provided with left and right hand threads at opposite ends, causes the bolts to be drawn together or forced apart depending upon the direction of rotation thereof.

An alternative seat mounting means is shown in the partial sectional elevation of Fig. 9 and includes a single stud or bolt 126 rigidly mounted to the seat supporting member say the member 50 and journaled through a sleeve 127 in the bottom 90 of the seat. In this embodiment a sleeve 127 is threaded through a pair of annular bosses 128, 129 affixed to the upper and under surfaces respectively of the member 90. A spring loaded plunger 132 is journaled through the end of the member 90 in alignment with a hole in the side of the sleeve 127 so as to be insertable in a hole 133 traversing the stud 126. A plurality of such transverse holes in the stud 126 provides alternative points of location of the member 90 with respect thereto. An upper stop member 134 and a lower stop member 135 limit the travel of the sleeve 127 on the stud. These various adjustable supporting means are useful primarily in establishing the desired tilt on the seat when in the riding position, and any means for accomplishing this purpose may be employed.

To slide the seat forwardly or backwardly when either in the riding position or reclining position, the handle 70 on the end of the rod 62 (see Fig. 4) is rotated against spring tension to disengage the pins 64, 66, etc., from the holes 68, 69 in the support straps 50, 51. The seat 16 including the seat cushion and the back cushion may then be slid forwardly or backwardly, the cams 74 and 75 riding on the tracks 26, 25 respectively and the seat cushion mounting straps 50, 51 riding on the rollers 46, 42 respectively. When the desired positioning of the seat is attained the handle 70 is released, the spring tension causing the pins to fall into aligned holes in the straps. In a similar manner the opposite side of the seat comprising the seat cushion 15 and the back cushion 14 may be independently adjusted with respect to its longitudinal position in the automobile.

The adjustment of the seat to form a bed within the automobile is most clearly shown in Fig. 3. In this procedure the seat assembly is slid forwardly as described in the foregoing paragraph and the cam latches 92, 96 associated with the cams 74, 75 respectively are released by pulling the chain 103 in the manner above described. The back cushion 14 is then free to rotate to the horizontal position. As the cushion rotates the cams 74 and 75 rotate past the shoulders separating the two curvilinear sections of the cams thereof. Rotation past this inset serves to lift the rear end of the seat cushion 16 into the plane of the horizontally disposed back cushion 14. With reference to the cam 75 (Fig. 3) rotation of the edge 75C which is curved on a radius about the pivot point 86 has no effect on the elevation of the seat cushion 16. However, as the edge 75B engages the track 75 the seat cushion 16 is elevated by an amount equal to the depth of the shoulder 84. In making the bed the openings 117 and 118 in the seat cover 116 are unzipped to permit the legs, of which the leg 114 is visible in Fig. 3, to pivot downwardly to rest on the automobile floor. If desired, the seat cushion of the back seat may be blocked so as to continue the horizontal surface formed by the seat cushion 16 and the back cushion 14 of the front seat. In a similar manner the cushions 13 and 15 may be independently adjusted to the horizontal position.

Referring now to Fig. 2, it will be observed that the cam 75 is provided with a hole 140 adjacent its trailing edge 75B and above the shoulder 84. The hole 140 serves as a secondary latch catch permitting the back cushion member 14 to be rotated to a point intermediate the vertical and horizontal positions. Rotation to this extent is accomplished on the edge 75C of the cam and thus does not interfere with the level of the seat cushion 16. Additional secondary latch and catch holes may be included to provide additional adjustability of the angle of inclination of the seat cushion 14. Similar means are provided with respect to the back cushion 13.

As hereinbefore indicated, the seat construction of the present invention is particularly adapted to use in coupes and two door sedans when it is necessary to gain access to the back seat through the front door. In automobiles of this type it is necessary that the back cushion of the front seat be free to pivot forwardly to permit this access. It will be observed from Fig. 2 and from the foregoing description that the cam latches are all stationarily affixed to the rear edge of the bottom member of the seat cushion and while the back rest cushions are in the substantially vertical position they are free to rotate forwardly. Such rotation causes the off-set 84 to rotate away from the latch 93 to an extent similarly determined by the impression of the back cushion into the seat cushion. Counter-rotation of the back cushion is stopped at the normal position by the latches projecting into the paths of the respective cam shoulders.

To adapt the seat structure of the invention to those makes of automobiles having a central longitudinal drive shaft housing (commonly referred to as a "torque tube") in the cab, is a comparatively simple matter. One means of performing this adaptation is illustrated in the partial rear elevation view of Fig. 7. In this figure the floor 150 of the automobile is seen to have a central drive shaft housing 152. This housing 152 is utilized to support the inner ends of separate seat supporting frameworks 154, 155 which together produce a framework which is substantially identical to the framework 18 described with relation to the foregoing figures. Thus the framework 154 supports the horizontal longitudinally directed tracks 156, 157 on which cams 158, 159, depending from the back cushion 160 are free to travel in the manner above described. The framework 155 is of similar construction.

Although the frameworks 154 and 155 are shown to be separate in the embodiment illustrated in Fig. 7, such is not a necessary feature and a framework such as the framework 18 (Fig. 1) may be supported across the drive shaft housing 152 in the manner illustrated in Fig. 7. In this type of mounting the spacers or bushings such as the spacer 162 are selected with relation to the drive shaft housing so that the frameworks 154, 155 will be supported horizontally above the framework of the automobile. Additionally it should be pointed out that even in those cars having a flat floor as for example the floor 12 (Figs. 1 and 2) the supporting frameworks for the two sides of the front seat may be separable as illustrated in Fig. 7. In such case mounting bushing or spacer 20 (Fig. 1) may be employed to support the inner ends of the two separable frameworks.

The separability of the supporting framework has no bearing on the functioning of the seat either in the driving or reclining position but does permit the use of only one seat in the front portion of the automobile cab if so desired. The use of a single driving seat leaving the so-called passenger side of the front part of the cab vacant is of particular benefit to salesmen, cripples and the like. Thus the part normally occupied by that portion of the front seat used by a passenger may form a convenient location for the storage of samples or merchandise or for the placement of a wheelchair making it possible for invalids to travel in their wheelchairs.

Possibly a more important feature of the seat of the invention is the ability to independently adjust either side with respect to longitudinal placement in the automobile or angle of inclination of the back rest member. This independent adjustment is possible with either the unitary supporting framework 18 or the divided supporting framework 154, 155. Thus in the manner above described, either of the seats may be placed forwardly or backwardly in the automobile and either of the seats may be partially or completely inclined, in the latter case making a bed half the width of the entire front seat. This independent operation of the seats is of particular advantage in long trips providing means whereby two people may spell each other driving and sleeping.

An alternative embodiment of the invention is shown in the partial rear elevation of Fig. 10 and in the plan view of Fig. 11 and in the sectional elevation of Fig. 12 which is taken on the line 12—12 of Fig. 10, and includes construction adaptable for use in conjunction with a torque tube as well as different placement of the cam runners. Referring to these figures the separate seat cushions 170 and 171 are supported on separate pairs of tracks mounted directly on the automobile floor 175 (tracks 173 appearing in Fig. 10) and are beveled inwardly along their inner longitudinal edges to clear the torque tube 176 running longitudinally along the floor 175. This type of construction permits lower mounting of the seat structure than in the embodiment of Fig. 7.

The back rest cushion 178 (and in like manner the back rest cushion 179) is recessed at 180 and 181 and separate cammed hinges or runners 183, 184 are fastened therein to angle plates 186, 187. One lip 186A and 187A of each of the plates is mounted to the back rest with the lip of each plate to which the hinges are attached extending forwardly into the recesses 180, 181. The inner lip 187B of the plate 187 is shown in Fig. 12. As shown in the drawing each of the angle plates may be fastened to the back rest by two pairs of bolts. By using a different number of washers under the top and bottom pairs the angle of the back rest member can be determined.

The seat cushion 170 (and in like manner the seat cushion 171) is slotted at 188 and 189 (Fig. 11), the respective hinges 183, 184 riding in the slots. Angle plates 190, 191 are disposed with their lips 190A and 191A underlying the seat cushion and affixed thereto and lips 190B and 191B extending upwardly along the inside faces of slots 188, 189 respectively. The hinges 183, 184 are pivotally mounted to pintles 193, 194 extending from the lips 190B, 191B respectively and latches 196, 197, mounted on the seat cushion framework, are adapted to engage one of a plurality of peripheral holes 198, 199, 200 in the respective hinges.

The hinges 183, 184 differ from those shown in the foregoing embodiments in having a continuous curvilinear cammed edge and a series of spaced latch holes 198, 199, 200 equidistant from the pintle 194 when the hinge is mounted thereon. The periphery of the hinge is eccentric with respect to the pintle so as to exert an upward thrust thereon when rotated counterclockwise (as viewed in Fig. 12). The latch bolts 196A, 197A have beveled lower edges to permit forward rotation of the back rest (clockwise as viewed in Fig. 12) which is limited by a stop pin 202 extending from the lip 191B of the angle member 191 and a similar pin (not shown) extending from the lip 190B of the member 190. These stop pins serve the double purpose of also limiting the counter-clockwise rotation of the cams as shown in dotted lines in Fig. 12.

The type of cammed hinge described with relation to Figs. 10–12 gives, by virtue of the continuous curvilinear cammed edge, smooth operation and permits two or more intermediate reclining positions. This hinge is not limited to use in this particular embodiment of the invention and may be used in any of the foregoing embodiments interchangeably with the hinge there shown.

As shown in Fig. 11 the outer edge of the seat cushion may be tapered inwardly so as to conform to the contours of substantially any automobile in which it is placed. If desired a cloth skirt 204 either separate (as shown) or forming a part of a conventional seat cover may be used to cover the hinges and associated parts, substantially all of which are recessed into and enclosed by the seat and back rest cushions.

Many detailed structural variations may occur to those skilled in the art without departing from the scope of the invention as defined in the foregoing description and the following claims.

I claim:

1. In a vehicle seat including a framework adapted to be affixed to the floor of the vehicle with a pair of spaced vehicle tracks running parallel to the longitudinal axis of the vehicle between front and rear cross members, a seat cushion, a back rest cushion, the combination comprising a pair of runners mounted to the undersurface of said seat cushion, a roller rotatably mounted in the front cross member in association with each of said runners, said runners being slidably supported by the rollers, a separate cam pivotally mounted at each side of the seat cushion and adjacent the rear edge thereof, each cam having a curvilinear edge slidable on one of said tracks and an elongated projection, the back rest cushion being affixed at each of its opposite sides to the elongated projecton on one of said cams, and catch means for releasably preventing the elongated projections of said cams from rotating toward the rear of the vehicle.

2. A vehicle seat comprising a frame work adapted to be affixed to the floor of the vehicle and including front and rear cross members, two spaced horizontal tracks running parallel to the longitudinal axis of the vehicle between the front and rear cross members, a strap mounted horizontally across the forward end of the tracks, a seat cushion, a pair of runners supporting the seat cushion in a substantially horizontal position, a roller rotatably mounted to the strap in line with each of said runners, said runners being slidably supported by the rollers, a separate cam pivotally mounted at each side of the seat cushion and adjacent to the rear edge, each cam having a cammed edge slidable on one of said tracks and an elongated projection, a back rest cushion affixed to and between the elongated projections of the cams, and catch means releasably preventing the elongated projections of said cams from rotating towards the rear of the vehicle.

3. A vehicle seat comprising a framework adapted to be affixed to the floor of the vehicle and including front and rear cross members, two spaced horizontal tracks running parallel to the longitudinal axis of the vehicle between the front and rear cross members, a seat cushion, a pair of runners supporting the seat cushion in a substantially horizontal position, a roller rotatably mounted to the front cross members in association with each of said runners, said runners being slidably supported by the rollers, a separate cam pivotally mounted at each side of the seat cushion and adjacent the rear edges thereof, each cam having a cammed edge slidable on one of said tracks and an elongated projection, a back rest cushion affixed at each side to the elongated projection on one of said cams, and catch means associated with each cam for releasably preventing the elongated projections of said cams from rotating towards the rear of the vehicle, the catch means associated with the cams being interconnected to permit simultaneous operation thereof.

4. In a vehicle seat including spaced horizontal tracks parallel to the longitudinal axis of the vehicle, a seat cushion, runners supporting the seat cushion at its forward edge above the tracks, the seat cushion having a pair of spaced recesses in its rear edge in vertical alignment with the tracks, two vertically disposed hinges pivotally mounted to the seat cushion in separate ones of said recesses, each hinge having a lower cammed edge slidably engaged with one of the tracks and an elongated projection at the opposite end, a back rest cushion having a pair of spaced recesses in its lower edge alignable with the recesses in the seat cushion, the elongated projections on the hinges being rigidly fastened to the back rest cushions in the recesses, and catch means for releasably preventing the elongated projections of said hinges from rotating about their cammed edges toward the back of the vehicle.

5. A vehicle seat according to claim 4 wherein the cammed edge of each hinge comprises a continuous curvilinear edge eccentric with respect to the pivot point of the hinge, and the hinge is provided with a plurality of spaced transverse holes adjacent the cammed edge and equidistant from the pivot point, the catch means being adapted to releasably engage in alternate ones of said holes brought into alignment therewith by rotation of the hinge.

6. A vehicle seat comprising a framework adapted to be affixed to the floor of the vehicle and including front and rear cross members, two spaced horizontal tracks running parallel to the longitudinal axis of the vehicle between the front and rear cross members, a seat cushion, a pair of runners supporting the seat cushion at its forward edge above the track, a roller rotatably mounted to the front cross member in association with each of said runners, said runners being slidably supported by the rollers, means for releasably locking the runners to prevent longitudinal displacement thereof, a separate cam pivotally mounted at each side of the seat cushion and adjacent the rear edge thereof, each cam having a cammed edge supported on one of said tracks and an elongated projection, a back rest cushion affixed at each side to the elongated projection on one of the cams and catch means associated with each cam for releasably preventing the elongated projections of said cams from rotating toward the rear of the vehicle.

7. Apparatus according to claim 6 wherein the means for releasably locking the runners comprises a transverse rotatably mounted shaft extending above the runners and holding the runners against the rollers, a separate depending pin mounted to the shaft in juxtaposition to each of the runners and adapted to engage in one of a plurality of longitudinally spaced holes in the runner and means at the end of the shaft for rotating the shaft to disengage the pins from the runners.

WILLIS R. BATTLES.

REFERENCES CITED

The following references are of record in the file of this patent:

UNITED STATES PATENTS

| Number | Name | Date |
|---|---|---|
| 1,658,408 | Lathrop | Feb. 7, 1928 |
| 1,799,870 | Seaman | Apr. 7, 1931 |
| 1,838,199 | Thomas | Dec. 29, 1931 |
| 1,981,212 | Zeller | Nov. 20, 1934 |
| 2,094,410 | Redding | Sept. 28, 1937 |
| 2,286,784 | Benzick et al. | June 16, 1942 |
| 2,304,199 | Pinnow | Dec. 8, 1942 |
| 2,324,902 | Benzick et al. | July 20, 1943 |

FOREIGN PATENTS

| Number | Country | Date |
|---|---|---|
| 449,677 | Great Britain | July 1, 1936 |